United States Patent
Teramoto et al.

(10) Patent No.: US 9,793,637 B2
(45) Date of Patent: Oct. 17, 2017

(54) CRIMP STRUCTURE, CRIMPING METHOD, AND ELECTRONIC DEVICE

(71) Applicant: OMRON Corporation, Kyoto-shi, Kyoto (JP)

(72) Inventors: Eiji Teramoto, Kyotanabe (JP); Tomoyuki Hakata, Uji (JP); Hitoshi Nakano, Kouka (JP); Kazuyoshi Nishikawa, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/120,133

(22) PCT Filed: Feb. 16, 2015

(86) PCT No.: PCT/JP2015/054076
§ 371 (c)(1),
(2) Date: Aug. 19, 2016

(87) PCT Pub. No.: WO2015/137043
PCT Pub. Date: Sep. 17, 2015

(65) Prior Publication Data
US 2017/0098905 A1    Apr. 6, 2017

(30) Foreign Application Priority Data
Mar. 14, 2014 (JP) .................. 2014-052385

(51) Int. Cl.
*H01R 13/658* (2011.01)
*B21D 39/04* (2006.01)
(Continued)

(52) U.S. Cl.
CPC ........... *H01R 13/405* (2013.01); *H01R 43/20* (2013.01)

(58) Field of Classification Search
CPC .... H01R 13/658; H01R 13/516; B21D 39/04; B21D 41/04; B21D 39/048;
(Continued)

(56) References Cited

U.S. PATENT DOCUMENTS

| 4,445,745 A | * | 5/1984 | Cartesse | ............... H01R 24/40 439/585 |
| 4,985,002 A | * | 1/1991 | Maisch | ............ H01R 13/65802 439/607.01 |
| 2004/0095032 A1 | | 5/2004 | Hase et al. | |

FOREIGN PATENT DOCUMENTS

| JP | S55-088939 A | 7/1980 |
| JP | H10-274216 A | 10/1998 |
(Continued)

*Primary Examiner* — Gary Paumen
(74) *Attorney, Agent, or Firm* — Metrolexis Law Group, PLLC

(57) ABSTRACT

Provided is a crimp structure in which an inner member and an outer member are joined to each other. The inner member includes an insertion portion having a columnar outer circumferential surface, and an annular groove provided in the outer circumferential surface. The outer member includes a main body portion, and a cylindrical portion continuous with the main body portion and forming an opening into which the insertion portion is inserted. The cylindrical portion includes a first reduced-diameter portion continuous with the main body portion via a first plastically-deformed portion and located further inward in a radial direction than the main body portion, and a second reduced-diameter portion continuous with the first reduced-diameter portion via a second plastically-deformed portion and located further inward in the radial direction than the first reduced-diameter portion. At least a part of the second reduced-diameter portion has entered the annular groove.

11 Claims, 10 Drawing Sheets

(51) Int. Cl.
*H01R 13/405* (2006.01)
*H01R 43/20* (2006.01)

(58) Field of Classification Search
CPC ......... Y10T 29/49169; Y10T 29/49174; Y10T 29/49181
USPC ............ 439/607.01, 901; 29/592.1, 854, 861
See application file for complete search history.

(56) References Cited

FOREIGN PATENT DOCUMENTS

| | | |
|---|---|---|
| JP | 2004-072924 A | 3/2004 |
| JP | 2006-000873 A | 1/2006 |

* cited by examiner

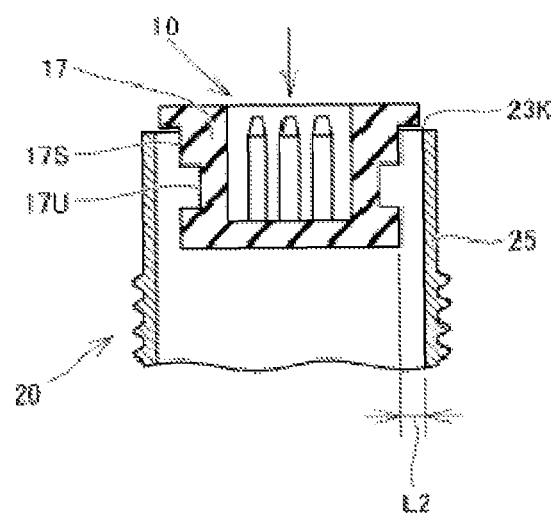
FIG.7 ST5
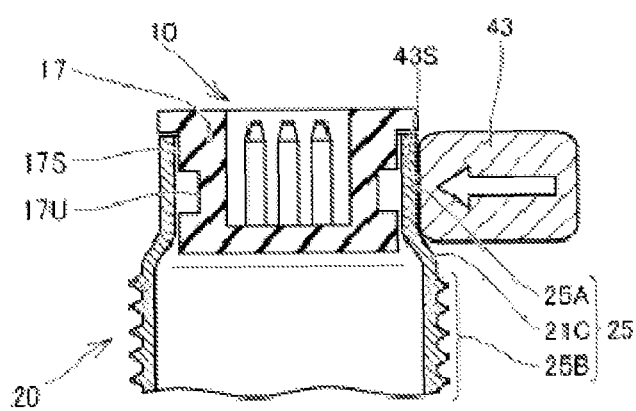
FIG.8 ST6
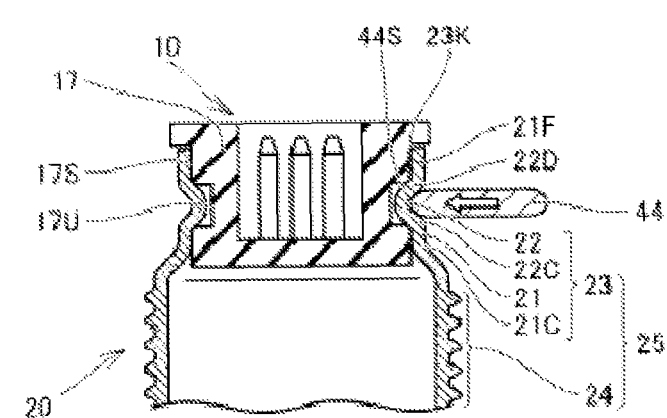
FIG.9 ST7

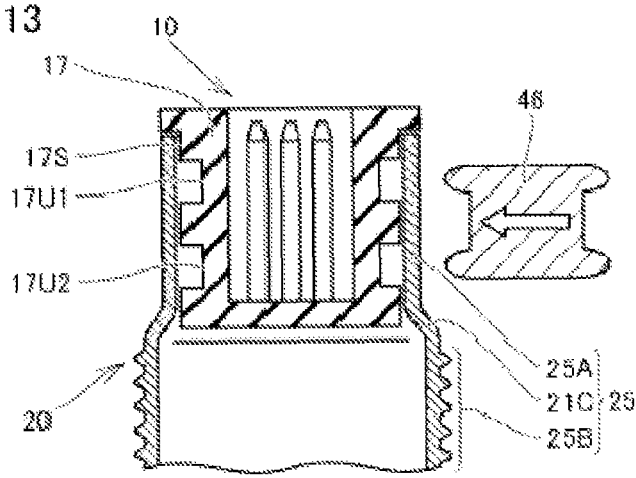
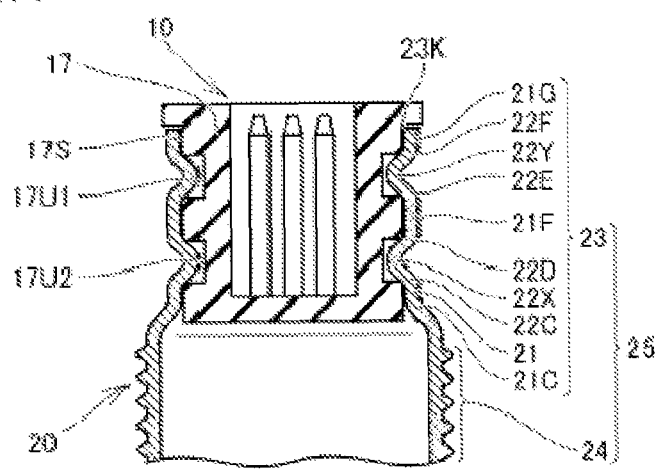
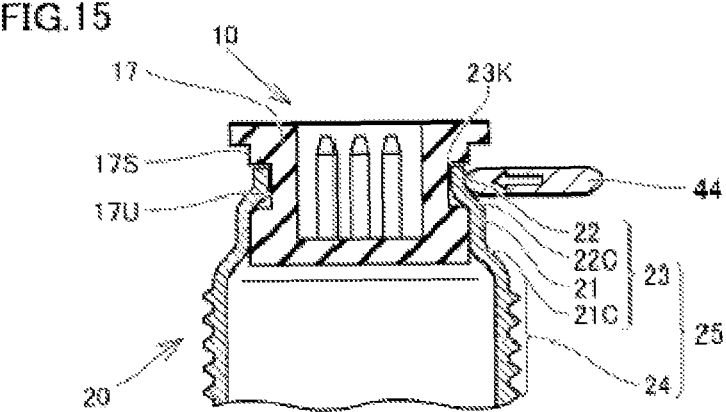

|  |  | Example A1 | Example A2 | Example A3 | Example A4 | Example A5 | Example A6 |
|---|---|---|---|---|---|---|---|
| Metal cover (joined portion) | Thickness [mm] | 0.10 | 0.20 | 0.40 | 0.70 | 1.00 | 1.20 |
| Connector | Groove width [mm] | 0.20 | 0.40 | 0.80 | 1.40 | 2.00 | 2.40 |
|  | Groove depth [mm] | 0.25 | 0.25 | 0.25 | 0.25 | 0.25 | 0.25 |
| S roller | Front end R | 0.30 | 0.30 | 0.30 | 0.30 | 0.30 | 0.30 |
| Evaluation |  | D | B | A | A | B | D |

FIG.21

| | | | Example B1 | Example B2 | Example B3 | Example B4 | Example B5 |
|---|---|---|---|---|---|---|---|
| Metal cover (joined portion) | Thickness [mm] | | 0.40 | 0.40 | 0.40 | 0.40 | 0.40 |
| Connector | Groove width | Metal cover thickness ratio | 1.0 | 1.5 | 2.5 | 3.5 | 4.0 |
| | | [mm] | 0.40 | 0.60 | 1.00 | 1.40 | 1.60 |
| | Groove depth [mm] | | 0.25 | 0.25 | 0.25 | 0.25 | 0.25 |
| S roller | Front end R | | 0.30 | 0.30 | 0.30 | 0.30 | 0.30 |
| Evaluation | | | D | C | B | A | A |

FIG.22

| | | Example C1 | Example C2 | Example C3 | Example C4 | Example C5 |
|---|---|---|---|---|---|---|
| Metal cover (joined portion) | Thickness [mm] | 0.40 | 0.40 | 0.40 | 0.40 | 0.40 |
| Connector | Groove width [mm] | 1.00 | 1.00 | 1.00 | 1.00 | 1.00 |
| | Groove depth [mm] | 0.10 | 0.15 | 0.20 | 0.25 | 0.30 |
| S roller | Front end R | 0.30 | 0.30 | 0.30 | 0.30 | 0.30 |
| Evaluation | | D | C | B | A | A |

FIG.23

| | | Example D1 | Example D2 | Example D3 | Example D4 | Example D5 |
|---|---|---|---|---|---|---|
| Metal cover (joined portion) | Thickness [mm] | 0.40 | 0.40 | 0.40 | 0.40 | 0.40 |
| Connector | Groove width [mm] | 1.00 | 1.00 | 1.00 | 1.00 | 1.00 |
| | Groove depth [mm] | 0.25 | 0.25 | 0.25 | 0.25 | 0.25 |
| S roller | Front end R | 0.30 | 0.30 | 0.30 | 0.30 | 0.30 |
| Amount of reduction in diameter of metal cover (ratio with respect to initial inner diameter [%]) | | 1.5 | 1.5 | 1.5 | 1.5 | 1.5 |
| Entry amount of second reduced-diameter portion [mm] | | 0.05 | 0.10 | 0.15 | 0.20 | 0.25 |
| Evaluation | | D | B | A | A | D |

FIG.24

|  |  | Example E1 | Example E2 | Example E3 | Example E4 | Example E5 |
|---|---|---|---|---|---|---|
| Metal cover (joined portion) | Thickness [mm] | 0.40 | 0.40 | 0.40 | 0.40 | 0.40 |
| Connector | Groove width [mm] | 1.00 | 1.00 | 1.00 | 1.00 | 1.00 |
|  | Groove depth [mm] | 0.20 | 0.20 | 0.20 | 0.20 | 0.20 |
| S roller | Front end R | 0.30 | 0.30 | 0.30 | 0.30 | 0.30 |
| Amount of reduction in diameter of metal cover (ratio with respect to initial inner diameter [%]) | | 0.3 | 0.6 | 0.9 | 1.2 | 1.5 |
| Evaluation | | D | C | A | A | C |

CRIMP STRUCTURE, CRIMPING METHOD, AND ELECTRONIC DEVICE

TECHNICAL FIELD

The present invention relates to a crimp structure and a crimping method in which two members are joined to each other by crimping, and an electronic device that is provided with such a crimp structure.

RELATED ART

JP 2004-072924A (Patent Document 1) and JP H10-274216A (Patent Document 2) disclose crimp structures in which a cylindrical outer member and an inner member that is arranged inside the outer member are joined to each other. The outer circumferential surface of the inner member is provided with an annular groove. By crimping a part of the outer member so that a part thereof enters the annular groove, the outer member and the inner member are joined to each other.

JP 2006-000873A (Patent Document 3) discloses a crimping method in which one metal pipe is inserted into another metal pipe having a diameter larger than that of the one metal pipe. Spinning is performed to reduce the diameter of an end of the other metal pipe, and a tubular neck portion is formed at the end of the other metal pipe. The diameter of the neck portion is further reduced in a state in which the neck portion is in intimate contact with the outer circumferential surface of the one metal pipe. Due to the further reduction in diameter of the neck portion, a part of the neck portion sinks into the outer circumferential surface of the one metal pipe, and the outer circumferential surface of the one metal pipe is pressed. As a result of the pressing, an annular groove is formed in the outer circumferential surface of the one metal pipe, and the neck portion of the other metal pipe is fitted to the one metal pipe.

RELATED ART DOCUMENTS

Patent Documents

Patent Document 1: JP 2004-072924A
Patent Document 2: JP H10-274216A
Patent Document 3: JP 2006-000873A

SUMMARY OF THE INVENTION

Problem to be Solved by the Invention

In conventional crimp structures and crimping methods, only a part of an outer member is locally deformed, so that a part thereof enters an annular groove of an inner member. Locally deforming a metal member will increase the load acting on the metal member. This may cause a decrease in water resistance or a reduction in service life, and thus it is conventionally needed to achieve a design that can resist such local deformation.

It is an object of the present invention to provide a crimp structure and a crimping method that can suppress local deformation that occurs at the time of crimping as compared to conventional cases, and an electronic device provided with such a crimp structure.

Means for Solving the Problems

According to the present invention, a crimp structure in which an inner member and an outer member that is arranged outside the inner member are joined to each other is such that the inner member includes: an insertion portion that has an outer circumferential surface having a shape of a columnar surface; and an annular groove that is provided in the outer circumferential surface, the outer member includes: a main body portion; and a cylindrical portion that is continuous with the main body portion, and forms an opening into which the insertion portion is inserted, and the cylindrical portion includes: a first reduced-diameter portion that is continuous with the main body portion via a first plastically-deformed portion, and is formed so as to be located further inward in a radial direction than the main body portion, due to plastic deformation of the first plastically-deformed portion; and a second reduced-diameter portion that is continuous with the first reduced-diameter portion via a second plastically-deformed portion, and is formed so as to be located further inward in the radial direction than the first reduced-diameter portion, due to plastic deformation of the second plastically-deformed portion, and at least a part of the second reduced-diameter portion has entered the annular groove.

Preferably, the outer circumferential surface of the insertion portion is made of a resin member.

Preferably, a plurality of the annular grooves are provided in the outer circumferential surface of the insertion portion.

Preferably, the annular groove has a recessed portion, the second reduced-diameter portion has a projecting portion, and the projecting portion and the recessed portion are fitted to each other.

According to the present invention, an electronic device includes the above-described crimp structure according to the present invention.

According to the present invention, a crimping method of performing crimping to join an outer member to an inner member that is arranged inside the outer member includes: an inner-member preparation step of preparing the inner member that includes an insertion portion that has an outer circumferential surface having a shape of a columnar surface, and an annular groove provided in the outer circumferential surface; an outer-member preparation step of preparing the outer member that includes a main body portion, and a cylindrical portion that is continuous with the main body portion, and forms an opening into which the insertion portion is to be inserted; an insertion step of inserting the insertion portion into the cylindrical portion; and a diameter-reducing step of reducing a diameter of the cylindrical portion with spinning, wherein, by reducing the diameter of the cylindrical portion, a first reduced-diameter portion that is formed so as to be located further inward in a radial direction than the main body portion, and a second reduced-diameter portion that is formed so as to be located further inward in the radial direction than the first reduced-diameter portion are formed on the cylindrical portion, and at least a part of the second reduced-diameter portion has entered the annular groove.

Preferably, the insertion step is performed prior to a step in which the first reduced-diameter portion is formed on the cylindrical portion.

Preferably, the insertion step is performed after a step in which the first reduced-diameter portion is formed on the cylindrical portion.

Preferably, in the diameter-reducing step, the first reduced-diameter portion is formed on the cylindrical portion, and then the second reduced-diameter portion is formed on the cylindrical portion.

Preferably, in the diameter-reducing step, the second reduced-diameter portion is formed on the cylindrical portion, and then the first reduced-diameter portion is formed on the cylindrical portion.

Preferably, the first reduced-diameter portion and the second reduced-diameter portion are formed by using one spinning roller.

Effects of the Invention

According to the present invention, it is possible to crimp an outer member against an inner member while suppressing local deformation that occurs. This can realize a highly reliable joined structure in which breakage of members rarely occurs, even if a metal material with low ductility is used or a relatively thin metal material is used.

BRIEF DESCRIPTION OF THE DRAWINGS

FIG. 7 is a cross-sectional view illustrating a fifth step (insertion step ST5) of the crimping method of Embodiment 1.

FIG. 8 is a cross-sectional view illustrating a sixth step (diameter-reducing step ST6) of the crimping method of Embodiment 1.

FIG. 9 is a cross-sectional view illustrating a seventh step (diameter-reducing step ST7) of the crimping method of Embodiment 1.

FIG. 13 is a cross-sectional view illustrating a diameter-reducing step (in a state in which a first diameter-reducing step is complete) of a crimping method according to Embodiment 4.

FIG. 14 is a cross-sectional view illustrating a diameter-reducing step (in a state in which a second diameter-reducing step is complete) of the crimping method of Embodiment 4.

FIG. 15 is a cross-sectional view illustrating a diameter-reducing step of a crimping method according to Embodiment 5.

FIG. 21 is a diagram illustrating experimental conditions and evaluations of Examples B1 to B5.

FIG. 22 is a diagram illustrating experimental conditions and evaluations of Examples C1 to C5.

FIG. 23 is a diagram illustrating experimental conditions and evaluations of Examples D1 to D5.

FIG. 24 is a diagram illustrating experimental conditions and evaluations of Examples E1 to E5.

EMBODIMENTS OF THE INVENTION

Figure 1:
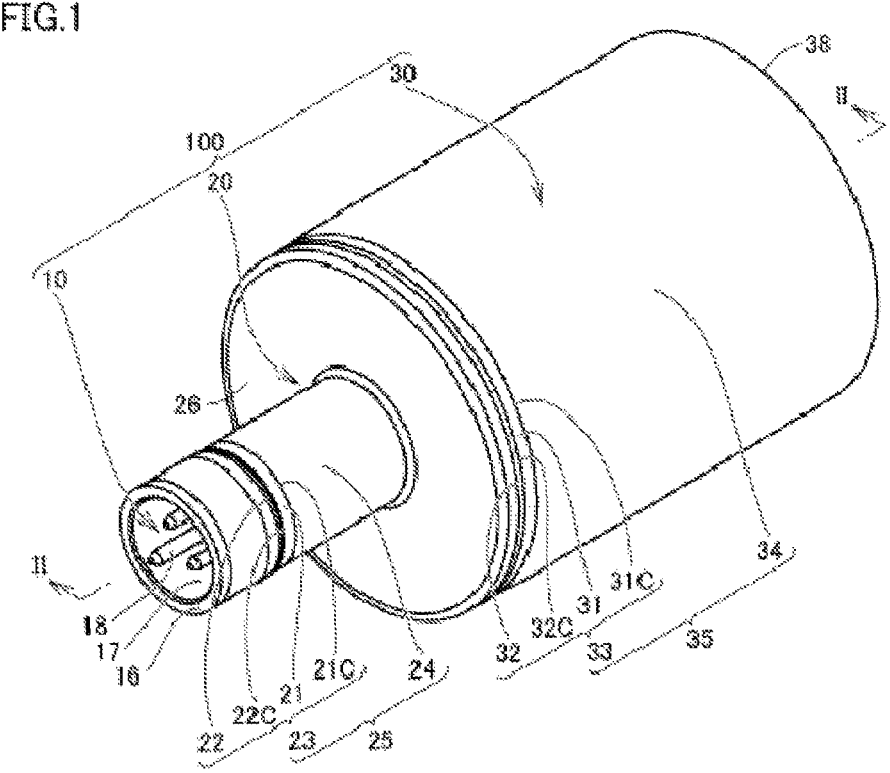
FIG. 1 is a perspective view illustrating an electronic device according to Embodiment 1.

Hereinafter, embodiments and examples according to the present invention will be described with reference to the drawings. When number, amount, and the like are mentioned, the scope of the present invention is not necessarily limited to the number, amount, and the like, unless specifically noted otherwise. Like reference numerals are given to like components and corresponding components, and redundant descriptions may be omitted.

Embodiment 1

Figure 2:
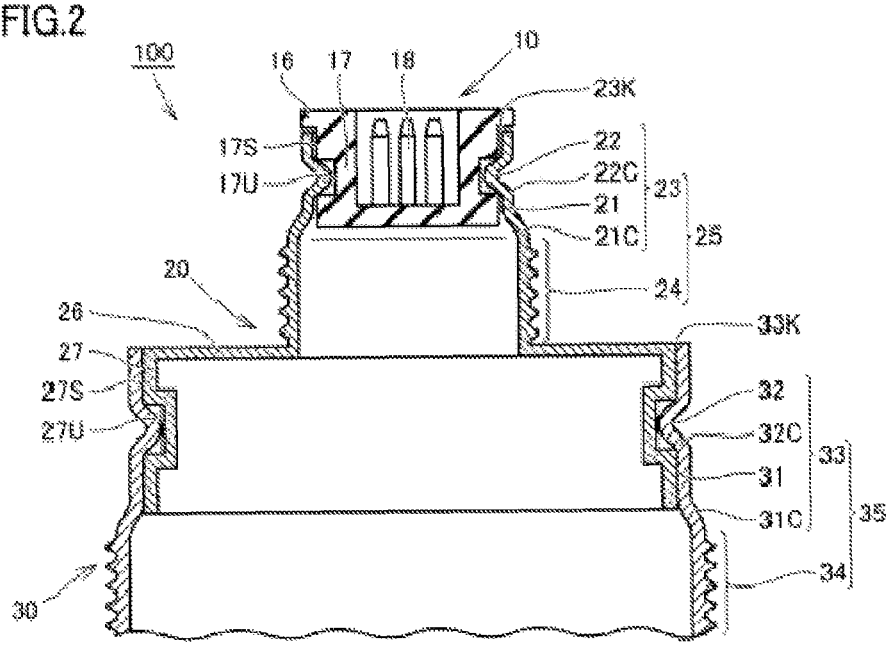
FIG. 2 is a cross-sectional view taken along a line II-II of FIG. 1.

FIG. 1 is a perspective view illustrating an electronic device 100 according to Embodiment 1. FIG. 2 is a cross-sectional view taken along a line II-II of FIG. 1. In FIG. 2, various electronic components that are arranged inside the electronic device 100 are not shown, for convenience of description. The electronic device 100 of the present embodiment constitutes a nearby sensor as an example. The electronic device 100 generates a magnetic field from a front face 38 (FIG. 1) side, and detects whether or not a detection target is present and approaching. In the description below, the side on which the front face 38 is located may be referred to as "front side", and the side on which a connector 10 (FIG. 1) is located may be referred to as "rear side". In FIG. 2, the lower side of the drawing corresponds to "front side", and the upper side of the drawing corresponds to "rear side".

Electronic Device 100

As shown in FIGS. 1 and 2, the electronic device 100 is provided with the connector 10, a cover body 20, and a base fitting 30. The base fitting 30 has a hollow cylindrical shape, and includes various electronic components. The cover body 20 (see FIG. 3 also) is arranged inside the base fitting 30 on the rear end side thereof, and closes the opening (opening 33K of FIGS. 2 and 3) on the rear end side of the base fitting 30.

The base fitting 30 is joined to the cover body 20 by crimping a part of the base fitting 30 inwardly, but the detailed crimp structure and crimping method will be described later. In the relationship between the cover body 20 and the base fitting 30, the cover body 20 corresponds to an inner member, and the base fitting 30 corresponds to an outer member.

The cover body 20 has, on the rear side thereof, a connector connecting portion 25 that has a hollow cylindrical shape. The connector 10 is arranged inside the connector connecting portion 25, and closes the opening (opening 23K of FIGS. 2 and 3) on the rear end side of the connector connecting portion 25.

The cover body 20 is joined to the connector 10 by crimping a part of the cover body 20 (connector connecting portion 25) inwardly, but the detailed crimp structure and crimping method will be described later. In the relationship between the connector 10 and the cover body 20, the connector 10 corresponds to an inner member, and the cover body 20 corresponds to an outer member.

Connector 10

The connector 10 is provided with an insertion portion 17 and terminal pins 18. The insertion portion 17 has a bottomed cylindrical shape, and is provided with a flange 16 on the rear end side thereof. The insertion portion 17 is made of resin, for example. The insertion portion 17 is a portion that is arranged inside a cylindrical portion 23 of the cover body 20, which will be described below. The insertion portion 17 includes an outer circumferential surface 17S (FIG. 2) having a shape of a columnar surface, and an annular groove 17U (FIG. 2) provided in the outer circumferential surface 17S. The portion of the insertion portion 17 that forms the outer circumferential surface 17S is also made of resin.

The annular groove 17U has a shape such that a part of the outer circumferential surface 17S is recessed inward in a radial direction. The width of the annular groove 17U is preferably at least a value that is obtained by "thickness of the connector connecting portion 25×1.5", in view of making it easy for a second reduced-diameter portion 22 (described later) to enter the annular groove 17U. The depth of the annular groove 17U is preferably at least a value that is obtained by "thickness of the connector connecting portion 25×0.4", in view of ensuring a depth of entry of the second reduced-diameter portion 22 (described later). The terminal pins 18 connect external devices and the electronic device 100, although a detailed configuration relating to the electrical connection is not shown.

Cover Body 20

The cover body 20 includes the connector connecting portion 25, a disk portion 26, and an insertion portion 27, and is formed integrally of a metal member. The connector connecting portion 25 is provided on the rear side of the cover body 20, and has a hollow cylindrical shape. The thickness of the connector connecting portion 25 is preferably about 0.2 mm to 1.0 mm, in view of strength retention and ease of plastic deformation. The connector connecting portion 25 includes a main body portion 24 and the cylindrical portion 23, which is continuous with the main body portion 24 and is provided on the rear side (upper side of FIG. 2) of the main body portion 24.

The main body portion 24 has a hollow cylindrical shape. As show in FIG. 2, the outer circumferential surface of the main body portion 24 is provided with a male thread (not shown in FIG. 1) as needed. Also the cylindrical portion 23 has a hollow cylindrical shape. The rear end (end on the upper side of FIG. 2) of the cylindrical portion 23 forms the opening 23K into which the insertion portion 17 of the connector 10 is inserted. The cylindrical portion 23 has a first plastically-deformed portion 21C, a first reduced-diameter portion 21, a second plastically-deformed portion 22C, and the second reduced-diameter portion 22.

The first plastically-deformed portion 21C is continuous with the main body portion 24, and is provided on the rear side of the main body portion 24. The first plastically-deformed portion 21C is a portion that is formed by crimping the metal member constituting the connector connecting portion 25 inwardly so that a part of this metal member is plastically deformed.

The first reduced-diameter portion 21 is continuous with the main body portion 24 via the first plastically-deformed portion 21C. The first reduced-diameter portion 21 is a portion that is formed so as to be located further inward in the radial direction than the main body portion 24 due to the plastic deformation of the first plastically-deformed portion 21C. In other words, the first reduced-diameter portion 21 is located further inward in the radial direction than the main body portion 24, due to the metal member constituting the connector connecting portion 25 being crimped inwardly at the position that corresponds to the first plastically-deformed portion 21C.

The second plastically-deformed portion 22C is continuous with the first reduced-diameter portion 21, and is provided on the rear side of the first reduced-diameter portion 21. The second plastically-deformed portion 22C is a portion that is formed by crimping the metal member constituting the connector connecting portion 25 inwardly so that a part of this metal member is plastically deformed.

The second reduced-diameter portion 22 is continuous with the first reduced-diameter portion 21 via the second plastically-deformed portion 22C. The second reduced-diameter portion 22 is a portion that is formed so as to be located further inward in the radial direction than the first reduced-diameter portion 21 due to the plastic deformation of the second plastically-deformed portion 22C. In other words, the second reduced-diameter portion 22 is a portion that is formed so as to be located further inward in the radial direction than the first reduced-diameter portion 21 due to the metal member constituting the connector connecting portion 25 being crimped inwardly at the position that corresponds to the second plastically-deformed portion 22C.

Together with the formation of the second plastically-deformed portion 22C on the connector connecting portion 25, the part (at least a part) of the second reduced-diameter portion 22 that is located inward in the radial direction has entered the annular groove 17U of the connector 10. In this context, "has entered" means the state in which at least a part of the second reduced-diameter portion 22 has advanced toward and is present in the inside (an inner space) of the annular groove 17U provided in advance on the connector 10.

The meaning of "has entered" in this context does not include a case where, by pressing the outer circumferential surface 17S of the connector 10 that is not provided with an annular groove 17U, an annular groove 17U is formed in the outer circumferential surface 17S. For example, the case where a part of the connector connecting portion 25 is crimped inwardly, and sinks into the outer circumferential surface 27S of the cover body 20 that is not provided with an annular groove 27U so as to form an annular groove therein does not fall under "enter" in this context.

In the present embodiment, with the above-described configuration of the first plastically-deformed portion 21C, the first reduced-diameter portion 21, the second plastically-deformed portion 22C, and the second reduced-diameter portion 22, a crimp structure is realized between the connector 10 and the cover body 20, and the connector 10 and the cover body 20 are joined to each other.

The disk portion 26 is provided at the front end of the main body portion 24. The insertion portion 27 is a portion that is arranged inside a cylindrical portion 33 of the base fitting 30, which will be described below. The insertion portion 27 has a shape that tubularly extends to the front from the peripheral edge of the disk portion 26. Specifically, the insertion portion 27 includes an outer circumferential surface 27S (FIG. 2) having a shape of a columnar surface, and an annular groove 27U (FIG. 2) provided in the outer circumferential surface 27S. The portion of the insertion portion 27 that forms the outer circumferential surface 27S is made of metal.

The annular groove 27U has a shape such that a part of the outer circumferential surface 27S is recessed inward in a radial direction. The width of the annular groove 27U is preferably at least a value that is obtained by "thickness of an accommodation portion 35×1.5", in view of making it easy for a second reduced-diameter portion 32 (described later) to enter the annular groove 27U. The depth of the annular groove 27U is preferably at least a value that is obtained by "thickness of the accommodation portion 35×0.4", in view of ensuring a depth of entry of the second reduced-diameter portion 32 (described later).

Base Fitting 30

The base fitting 30 includes the accommodation portion 35 that has a hollow cylindrical shape, and the front face 38 (FIG. 1) thereof is closed by another resin member (not shown). The accommodation portion 35 is made of a metal member, and accommodates a coil for detection, a printed board, and the like. The thickness of the accommodation portion 35 is preferably about 0.2 mm to 1.0 mm, in view of strength retention and ease of plastic deformation. The accommodation portion 35 includes a main body portion 34, and the cylindrical portion 33, which is continuous with the main body portion 34 and is provided on the rear side (upper side of FIG. 2) of the main body portion 34.

The main body portion 34 has a hollow cylindrical shape. As shown in FIG. 2, the outer circumferential surface of the main body portion 34 is provided with a male thread (not shown in FIG. 1) as needed. Also the cylindrical portion 33 has a hollow cylindrical shape. The rear end (end on the upper side of FIG. 2) of the cylindrical portion 33 forms the opening 33K into which the insertion portion 27 of the cover body 20 is inserted. The cylindrical portion 33 includes a first plastically-deformed portion 31C, a first reduced-diameter portion 31, a second plastically-deformed portion 32C, and the second reduced-diameter portion 32.

The first plastically-deformed portion 31C is continuous with the main body portion 34, and is provided on the rear side of the main body portion 34. The first plastically-deformed portion 31C is a portion that is formed by crimping the metal member constituting the accommodation portion 35 inwardly so that a part of the metal member is plastically deformed.

The first reduced-diameter portion 31 is continuous with the main body portion 34 via the first plastically-deformed portion 31C. The first reduced-diameter portion 31 is a portion that is formed so as to be located further inward in the radial direction than the main body portion 34 due to the plastic deformation of the first plastically-deformed portion 31C. In other words, the first reduced-diameter portion 31 is located further inward in the radial direction than the main body portion 34, due to the metal member constituting the located accommodation portion 35 being crimped inwardly at the position that corresponds to the first plastically-deformed portion 31C.

The second plastically-deformed portion 32C is continuous with the first reduced-diameter portion 31, and is provided on the rear side of the first reduced-diameter portion 31. The second plastically-deformed portion 32C is a portion that is formed by crimping the metal member constituting the accommodation portion 35 inwardly so that a part of that metal member is plastically deformed.

The second reduced-diameter portion 32 is continuous with the first reduced-diameter portion 31 via the second plastically-deformed portion 32C. The second reduced-diameter portion 32 is a portion that is formed so as to be located further inward in the radial direction than the first reduced-diameter portion 31 due to the plastic deformation of the second plastically-deformed portion 32C. In other words, the second reduced-diameter portion 32 is located further inward in the radial direction than the first reduced-diameter portion 31, due to the metal member constituting the accommodation portion 35 being crimped inwardly at the position that corresponds to the second plastically-deformed portion 32C.

Together with the formation of the second plastically-deformed portion 32C on the accommodation portion 35, the part (at least a part) of the second reduced-diameter portion 32 that is located inward in the radial direction has entered the annular groove 27U of the cover body 20. In this context, "has entered" means the state in which at least a part of the second reduced-diameter portion 32 has advanced toward and is present in the inside (an inner space) of the annular groove 27U provided in advance on the cover body 20.

The meaning of "has entered" in this context does not include a case where, by pressing the outer circumferential surface 27S of the cover body 20 that is not provided with an annular groove 27U, an annular groove 27U is formed in the outer circumferential surface 27S. For example, the case where a part of the accommodation portion 35 is crimped inwardly, and sinks into the outer circumferential surface 27S of the cover body 20 that is not provided with an annular groove 27U so as to form an annular groove therein does not fall under "enter" in this context.

In the present embodiment, with the above-described configuration of the first plastically-deformed portion 31C, the first reduced-diameter portion 31, the second plastically-deformed portion 32C, and the second reduced-diameter portion 32, a crimp structure is realized between the cover body 20 and the base fitting 30, and the cover body 20 and the base fitting 30 are joined to each other.

Crimping Method
Preparation Step ST1

Figure 3:
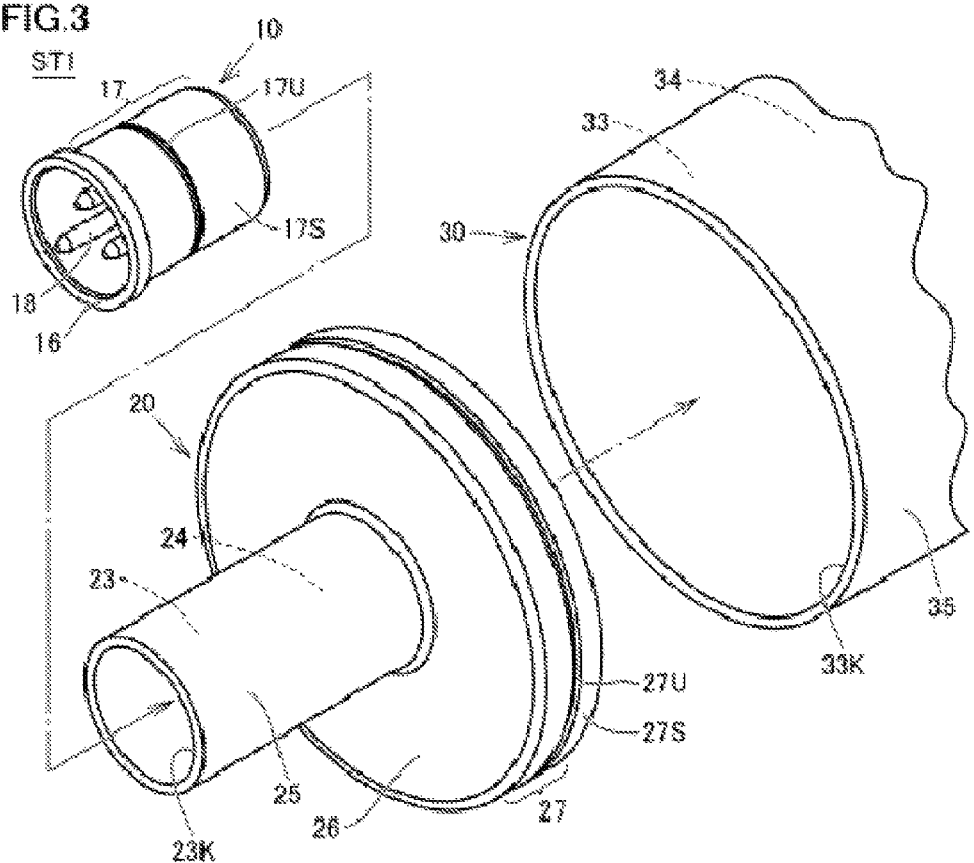
FIG. 3 is a perspective view illustrating a first step (preparation step ST1) of a crimping method of Embodiment 1.

The crimping method according to the present embodiment will be described with reference to FIGS. 3 to 9. As shown in FIG. 3, first, the connector 10, the cover body 20, and the base fitting 30 are prepared (preparation step ST1). The connector 10, the cover body 20, and the base fitting 30 of FIG. 3 are shown in a state prior to these members being subjected to crimping.

The connector 10 includes: the insertion portion 17 that has the outer circumferential surface 17S having a shape of a columnar surface; the annular groove 17U provided in the outer circumferential surface 17S; the flange 16; and the terminal pins 18. The cover body 20 includes: the connector connecting portion 25 having the opening 23K; the disk portion 26; the insertion portion 27 that has the outer circumferential surface 27S having a shape of a columnar surface; and the annular groove 27U provided in the outer circumferential surface 27S.

The cylindrical portion 23 (FIGS. 1 and 2) and the main body portion 24 (FIGS. 1 and 2) are to be formed on the connector connecting portion 25 of the cover body 20 in later steps. The part of the connector connecting portion 25 that the insertion portion 17 is to be inserted into corresponds to the cylindrical portion 23, and the part of the connector connecting portion 25 that is continuous with the cylindrical portion 23 and is located on the front side of the cylindrical portion 23 corresponds to the main body portion 24.

Similarly, the cylindrical portion 33 (FIGS. 1 and 2) and the main body portion 34 (FIGS. 1 and 2) are to be formed on the accommodation portion 35 of the base fitting 30 in later steps. The part of the accommodation portion 35 that the insertion portion 27 is to be inserted into corresponds to the cylindrical portion 33, and the part of the accommodation portion 35 that is continuous with the cylindrical portion 33 and is located on the front side of the cylindrical portion 33 corresponds to the main body portion 34.

Insertion Step ST2

Figure 4:
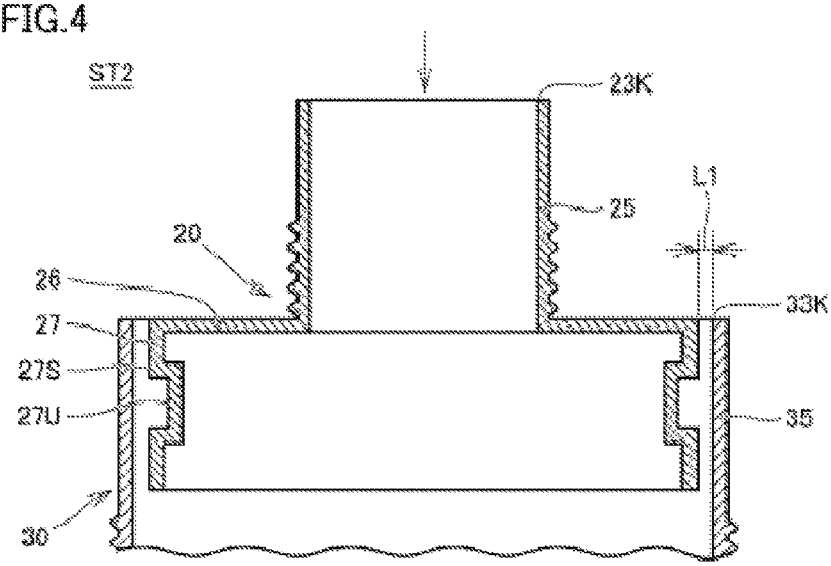
FIG. 4 is a cross-sectional view illustrating a second step (insertion step ST2) of the crimping method of Embodiment 1.

Referring to FIG. 4, the insertion portion 27 of the cover body 20 is inserted into the accommodation portion 35 of the base fitting 30 via the opening 33K. A gap L1 is provided between the inner circumferential surface of the accommodation portion 35 and the outer circumferential surface 27S of the insertion portion 27.

Diameter-Reducing Step ST3

Figure 5:
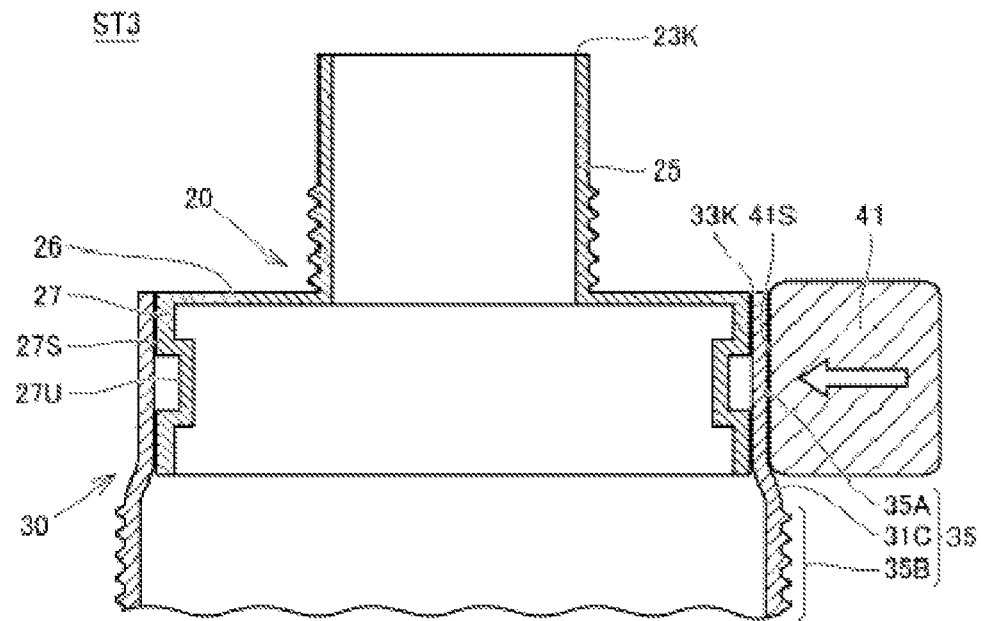
FIG. 5 is a cross-sectional view illustrating a third step (diameter-reducing step ST3) of the crimping method of Embodiment 1.

Referring to FIG. 5, a spinning roller 41 is used to perform spinning (crimping) on the accommodation portion 35 of the base fitting 30. By applying a crimping load from a surface 41S of the spinning roller 41, the diameter of the portion of the accommodation portion 35 that is in the vicinity of the opening 33K is reduced. When the spinning is complete, a reduced-diameter portion 35A, the first plastically-deformed portion 31C, and a non-deformed portion 35B are formed on the accommodation portion 35.

The reduced-diameter portion 35A is continuous with the non-deformed portion 35B via the first plastically-deformed portion 31C. The reduced-diameter portion 35A is a portion that is formed so as to be located further inward in the radial direction than the non-deformed portion 35B due to plastic deformation of the first plastically-deformed portion 31C. The reduced-diameter portion 35A and the first plastically-deformed portion 31C are to constitute the cylindrical portion 33 of the accommodation portion 35, and the non-deformed portion 35B is to constitute the main body portion 34 of the accommodation portion 35, on completion of the crimping method of the present embodiment.

Diameter-Reducing Step ST4

Figure 6:
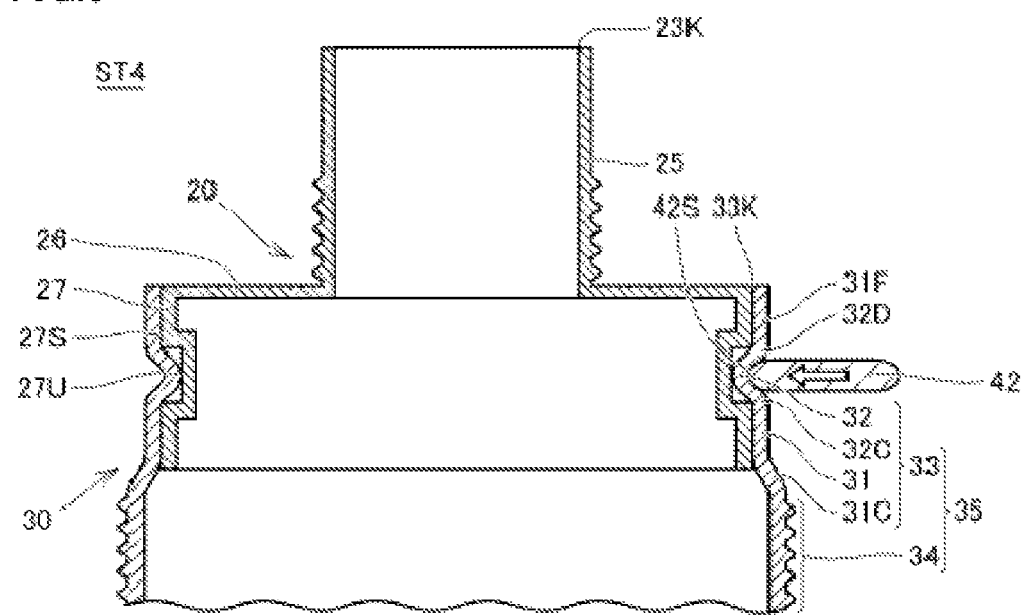
FIG. 6 is a cross-sectional view illustrating a fourth step (diameter-reducing step ST4) of the crimping method of Embodiment 1.

Referring to FIG. 6, a spinning roller 42 is used to perform spinning (crimping) on the reduced-diameter portion 35A (FIG. 5) of the base fitting 30. By applying a crimping load from a surface 42S of the spinning roller 42, the diameter of a part of the reduced-diameter portion 35A (FIG. 5) (a part of the portion that is to constitute the cylindrical portion 33) is reduced. When the spinning is complete, the reduced-diameter portion 35A and the first plastically-deformed portion 31C constitute the cylindrical portion 33 (FIG. 6), and the non-deformed portion 35B constitutes the main body portion 34.

The cylindrical portion 33 includes the first reduced-diameter portion 31, which is located further inward in the radial direction than the main body portion 34, and the second reduced-diameter portion 32, which is located further inward in the radial direction than the first reduced-diameter portion 31. The part (at least a part) of the second reduced-diameter portion 32 that is located inward in the radial direction has entered the annular groove 27U of the cover body 20. Another second plastically-deformed portion 32D that is continuous with the second reduced-diameter portion 32 is formed on the rear end side of the second reduced-diameter portion 32, and another first plastically-deformed portion 31F is formed on the rear end side of the second plastically-deformed portion 32D.

Here, the position of an opening edge (position on the outer circumferential surface 27S) of the annular groove 27U is set as a reference position. The distance from this reference position to a position of the front end, in an entering direction, of the second reduced-diameter portion 32 that has entered the annular groove 27U is set as "entry amount of the second reduced-diameter portion 32". The entry amount of the second reduced-diameter portion 32 is preferably from a value obtained by "thickness of the base fitting 30×0.3" to a value obtained by "thickness of the base fitting 30×0.9", in view of ensuring the joining strength between the base fitting 30 and the cover body 20 without causing breakage of the base fitting 30.

When the diameter-reducing step ST4 is complete, the accommodation portion 35 that is provided with the cylindrical portion 33 having the above-described configuration and the main body portion 34 is formed on the base fitting 30. In the present embodiment, the first reduced-diameter portion 31 is formed, and then the second reduced-diameter portion 32 is formed. A crimp structure is realized between the cover body 20 and the base fitting 30, and the cover body 20 and the base fitting 30 are joined to each other.

Insertion Step ST5

Referring to FIG. 7, the insertion portion 17 of the connector 10 is then inserted into the connector connecting portion 25 of the cover body 20 via the opening 23K. A gap L2 is provided between the inner circumferential surface of the connector connecting portion 25 and the outer circumferential surface 17S of the insertion portion 17.

Diameter-Reducing Step ST6

Referring to FIG. 8, a spinning roller 43 is used to perform spinning (crimping) on the connector connecting portion 25 of the cover body 20. By applying a crimping load from a surface 43S of the spinning roller 43, the diameter of the portion of the connector connecting portion 25 that is in the vicinity of the opening 23K is reduced. When the spinning is complete, a reduced-diameter portion 25A, the first plastically-deformed portion 21C, and a non-deformed portion 25B are formed on the connector connecting portion 25.

The reduced-diameter portion 25A is continuous with the non-deformed portion 25B via the first plastically-deformed portion 21C. The reduced-diameter portion 25A is a portion that is formed so as to be located further inward in the radial direction than the non-deformed portion 25B due to plastic deformation of the first plastically-deformed portion 21C. The reduced-diameter portion 25A and the first plastically-deformed portion 21C are to constitute the cylindrical portion 23 of the connector connecting portion 25, and the non-deformed portion 25B is to constitute the main body portion 24 of the connector connecting portion 25, on completion of the crimping method of the present embodiment.

Diameter-Reducing Step ST7

Referring to FIG. 9, a spinning roller 44 is used to perform spinning (crimping) on the reduced-diameter portion 25A (FIG. 8) of the cover body 20. By applying a crimping load from a surface 44S of the spinning roller 44, the diameter of a part of the reduced-diameter portion 25A (FIG. 8) (a part of the portion that is to constitute the cylindrical portion 23) is reduced. When the spinning is complete, the reduced-diameter portion 25A and the first plastically-deformed portion 21C constitute the cylindrical portion 23 (FIG. 9), and the non-deformed portion 25B constitutes the main body portion 24.

The cylindrical portion 23 includes the first reduced-diameter portion 21, which is located further inward in the radial direction than the main body portion 24, and the second reduced-diameter portion 22, which is located further inward in the radial direction than the first reduced-diameter portion 21. The part (at least a part) of the second reduced-diameter portion 22 that is located inward in the radial direction has entered the annular groove 17U of the connector 10. Another second plastically-deformed portion 22D that is continuous with the second reduced-diameter portion 22 is formed on the rear end side of the second reduced-diameter portion 22, and a first reduced-diameter portion 21F is formed on the rear end side of the second plastically-deformed portion 22D.

Here, the position of an opening edge (position on the outer circumferential surface 17S) of the annular groove 17U is set as a reference position. The distance from this reference position to a position of the front end, in an entering direction, of the second reduced-diameter portion 22 that has entered the annular groove 17U is set as "entry amount of the second reduced-diameter portion 22". The entry amount of the second reduced-diameter portion 22 is preferably from a value obtained by "thickness of the connector connecting portion 25×0.3" to a value obtained by "thickness of the connector connecting portion 25×0.9", in view of ensuring the joining strength between the cover body 20 and the connector 10 without causing breakage of the connector connecting portion 25 of the cover body 20.

When the diameter-reducing step ST7 is complete, the connector connecting portion 25 that is provided with the cylindrical portion 23 having the above-described configuration and the main body portion 24 is formed on the cover body 20. In the present embodiment, the first reduced-diameter portion 21 is formed, and then the second reduced-diameter portion 22 is formed. A crimp structure is realized between the connector 10 and the cover body 20, and the connector 10 and the cover body 20 are joined to each other.

Functions and Effects

Referring to FIGS. 5 and 6, in the present embodiment, diameter-reducing step ST3 and diameter-reducing step ST4 are performed when the base fitting 30 is joined to the cover body 20. That is, not only the diameter of the part (second reduced-diameter portion 32) that enters the annular groove 27U but also the diameter of the part (first reduced-diameter portion 31) in the vicinity of the entering part (second reduced-diameter portion 32) are reduced. According to the configuration, the amount of reduction in diameter of the entering part (second reduced-diameter portion 32) or the amount of deformation thereof that is needed for actual joining is reduced due to the reduction in diameter of the part (first reduced-diameter portion 31) in the vicinity of the entering part. Accordingly, it is possible to suppress local deformation that occurs in the part that enters the annular groove 27U and the part in the vicinity thereof.

Referring to FIGS. 8 and 9, similarly, diameter-reducing step ST6 and diameter-reducing step ST7 are performed when the cover body 20 is joined to the connector 10. That is, not only the diameter of the part (second reduced-diameter portion 22) that enters the annular groove 17U but also the diameter of the part (first reduced-diameter portion 21) in the vicinity of the entering part (second reduced-diameter portion 22) are reduced. According to the configuration, the amount of reduction in diameter of the entering part (second reduced-diameter portion 22) or the amount of deformation thereof that is needed for actual joining is reduced due to the reduction in diameter of the part (first reduced-diameter portion 21) in the vicinity of the entering part. Accordingly, it is possible to suppress local deformation that occurs in the part that enters the annular groove 17U and the part in the vicinity thereof.

According to the above-described configuration, even if a metal material with low ductility or a relatively thin metal material is used as a member that constitutes the main body portion 34 of the base fitting 30 or the connector connecting portion 25 of the cover body 20, it is possible to realize a highly reliable joined structure in which breakage of the member rarely occurs.

In contrast to the case of JP 2006-000873A (Patent Document 3) mentioned in the introduction, the present embodiment employs a configuration in which a part of an outer member is deformed so that a part thereof enters an annular groove of an inner member. Accordingly, as described with reference to an example in which the cover body 20 is joined to the connector 10, the present embodiment is applicable to a case where a cylindrical metal member is joined to a resin member that is arranged inside thereof. In the case of Patent Document 3, by reducing the diameter of the neck portion, a part of the neck portion sinks into the outer circumferential surface of the one metal pipe, and the outer circumferential surface of the one metal pipe is pressed. As a result of the pressing, an annular groove is formed in the outer circumferential surface of the one metal pipe, and the neck portion of the other metal pipe is fitted to the one metal pipe. When this configuration is applied, it is difficult to use a resin inner member.

Comparative Example

Figure 10:
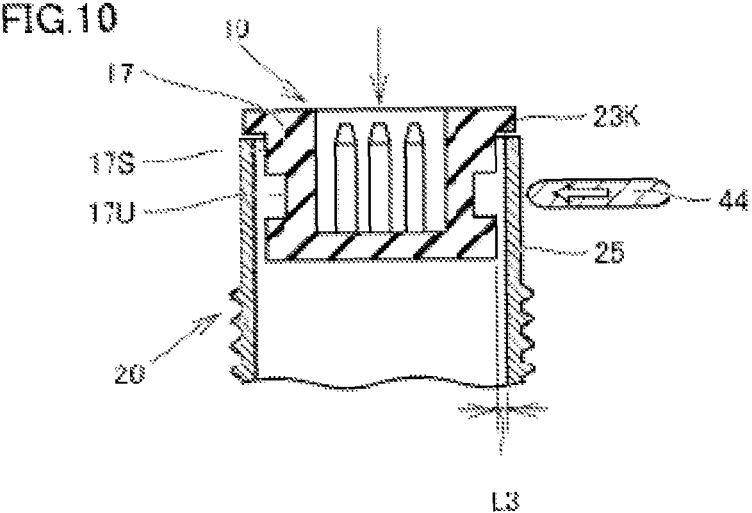
FIG. 10 is a cross-sectional view illustrating an insertion step of a crimping method according to a comparative example.

Referring to FIG. 10, a configuration is such that the cover body 20 is joined to the connector 10, only by reducing the diameter of the part (second reduced-diameter portion 22) that enters the annular groove 17U. In this case, it is necessary to reduce the amount of reduction in diameter of the entering part (second reduced-diameter portion 22) or the amount of deformation thereof, in order to suppress a decrease in water resistance or a reduction in service life. That is, a gap L1 between the inner circumferential surface of the connector connecting portion 25 and the outer circumferential surface 17S of the insertion portion 17 needs to be smaller than in the case of Embodiment 1 above (gap L2 of FIG. 7). This requires restrictions in design or high accuracy in production.

On the other hand, in Embodiment 1 above, since not only the diameter of the part (second reduced-diameter portion) that enters the annular groove but also the part (first reduced-diameter portion) in the vicinity of the entering part (second reduced-diameter portion) are reduced, a decrease in water resistance and a reduction in service life are suppressed. Accordingly, restrictions in design or accuracy in production does not need to be taken into consideration when the configuration of Embodiment 1 above is employed, as compared to the comparative example, and thus the configuration of Embodiment 1 is highly convenient. The same applies to the gap L1 (FIG. 4) between the inner circumferential surface of the accommodation portion 35 and the outer circumferential surface 27S of the insertion portion 27.

Embodiment 2

Figure 11:
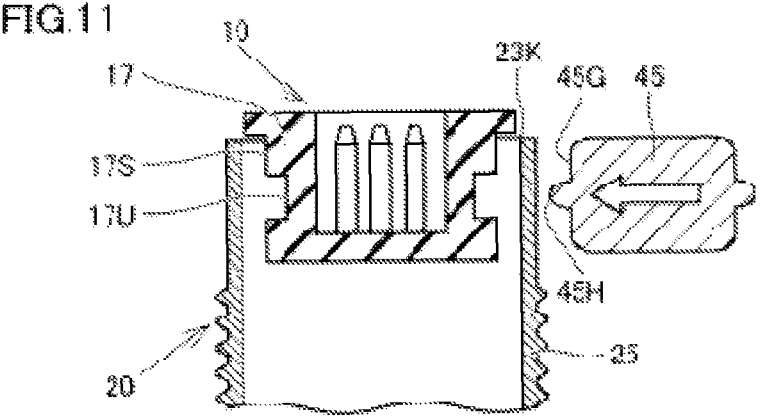
FIG. 11 is a cross-sectional view illustrating a diameter-reducing step of a crimping method according to Embodiment 2.

Referring to FIG. 11, in Embodiment 1 above, the spinning roller 43 (FIG. 8) and the spinning roller 44 (FIG. 9) are used when the cover body 20 is joined to the connector 10. As shown in FIG. 11, a spinning roller 45 may be used when the cover body 20 is joined to the connector 10. The spinning roller 45 has a large-diameter portion 45H for forming the second reduced-diameter portion 22 (FIGS. 2 and 9), and a small-diameter portion 45G for forming the first reduced-diameter portion 21 (FIGS. 2 and 8).

When the spinning roller 45 is used, the second reduced-diameter portion 22 is formed, and then the first reduced-diameter portion 21 is formed. Also with this configuration, it is possible to suppress local deformation that occurs in the part that enters the annular groove 17U (second reduced-diameter portion 22) and the part in the vicinity thereof, achieving the same functions and effects as those of Embodiment 1 above. Since the first reduced-diameter portion 21 and the second reduced-diameter portion 22 are formed by using one spinning roller 45, it is also possible to reduce the manufacturing time, and the like.

Embodiment 3

Figure 12:
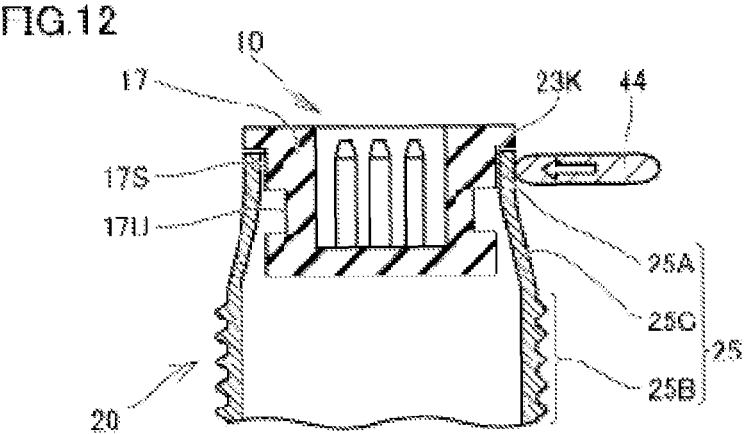
FIG. 12 is a cross-sectional view illustrating a diameter-reducing step of a crimping method according to Embodiment 3.

Referring to FIG. 12, in Embodiment 1 above, the spinning roller 43 (FIG. 8) and the spinning roller 44 (FIG. 9) are used when the cover body 20 is joined to the connector 10. As shown in FIG. 12, only the spinning roller 44 may be used when the cover body 20 is joined to the connector 10. The spinning roller 44 first reduces the diameter of the portion of the connector connecting portion 25 that is in the vicinity of the opening 23K. With the reduction in diameter, the part that is to form the second reduced-diameter portion 22 (FIG. 2) is displaced inwardly, and the reduced-diameter portion 25A, a plastically-deformed portion 25C, and the non-deformed portion 25B are formed on the connector connecting portion 25.

Then, similar to the case described with reference to FIG. 9, the spinning roller 44 reduces the diameter of the part of the reduced-diameter portion 25A that corresponds to the second reduced-diameter portion 22, so as to form the second reduced-diameter portion 22. Even this configuration can achieve the same configuration as that shown in FIG. 2. Since the first reduced-diameter portion 21 and the second reduced-diameter portion 22 are formed by using one spinning roller 44, it is possible to reduce the manufacturing time, and the like.

Embodiment 4

Referring to FIG. 13, in the present embodiment, two annular grooves 17U1 and 17U2 are provided in the outer circumferential surface 17S of the connector 10, and a spinning roller 46 having a shape that corresponds to the annular grooves 17U1 and 17U2 is used. Similar to the case described with reference to FIG. 8, first, the reduced-diameter portion 25A is formed on the connector connecting portion 25. Then, the spinning roller 46 is used to form two second reduced-diameter portions 22X and 22Y (FIG. 14).

As shown in FIG. 14, the cylindrical portion 23 is provided with the first plastically-deformed portion 21C, which is continuous with the main body portion 24, the first reduced-diameter portion 21, which is continuous with the first plastically-deformed portion 21C, the second plastically-deformed portion 22C, which is continuous with the first reduced-diameter portion 21, the second reduced-diameter portion 22X, which is continuous with the second plastically-deformed portion 22C and has entered the annular groove 17U2, and the second plastically-deformed portion 22D, which is located closer to the rear end than the second reduced-diameter portion 22X. The cylindrical portion 23 is further provided with the first reduced-diameter portion 21F, which is continuous with the second plastically-deformed portion 22D, a second plastically-deformed portion 22E, which is continuous with the first reduced-diameter portion 21F, the second reduced-diameter portion 22Y, which is continuous with the second plastically-deformed portion 22E and has entered the annular groove 17U1, a second plastically-deformed portion 22F, which is located closer to the rear end than the second reduced-diameter portion 22Y, and a first plastically-deformed portion 21G, which is continuous with the second plastically-deformed portion 22F. The present invention is not limited to the foregoing configuration, and two or more annular grooves may be provided in the outer circumferential surface 17S of the connector 10, as needed.

Embodiment 5

Referring to FIG. 15, in Embodiment 1 above, (see FIGS. 8 and 9), the spinning roller 44 reduces the diameter of the approximately central part, in the longitudinal direction, of the reduced-diameter portion 25A. The second reduced-diameter portion 22 is formed in the approximately central part, in the longitudinal direction, of the cylindrical portion 23, and has entered the annular groove 17U.

As shown in FIG. 15, the second reduced-diameter portion 22 in the present embodiment is formed in the vicinity of the opening 23K of the cylindrical portion 23. The part of the cylindrical portion 23 that forms the opening 23K has been displaced inwardly in the radial direction, and has entered the annular groove 17U. Even this configuration can achieve the same functions and effects as those of the foregoing embodiments.

Embodiment 6

Figure 16:
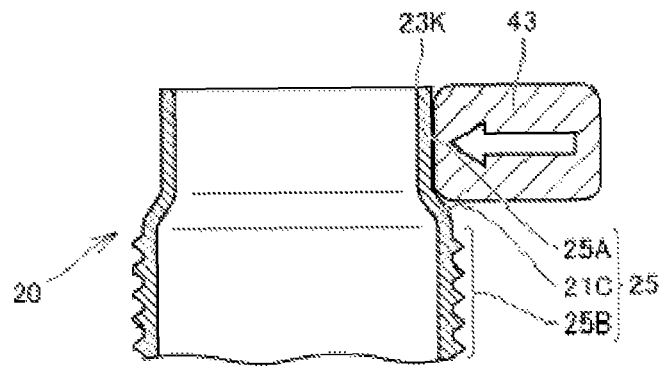
FIG. 16 is a cross-sectional view illustrating a diameter-reducing step of a crimping method according to Embodiment 6.
Figure 17:
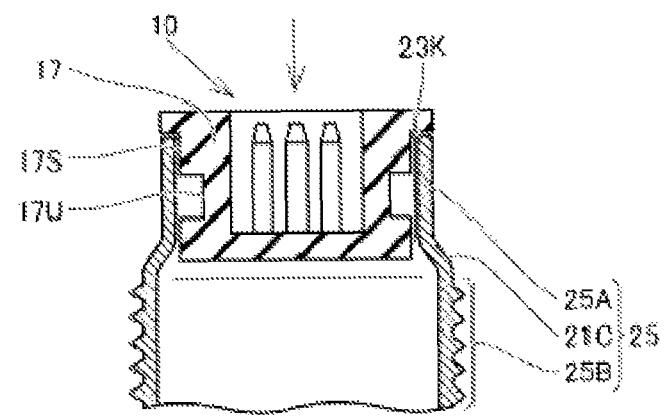
FIG. 17 is a cross-sectional view illustrating an insertion step of the crimping method of Embodiment 6.

Referring to FIGS. 16 and 17, in the foregoing embodiments, the step for inserting an insertion portion (such as the insertion portion 17) is performed prior to the step in which a first reduced-diameter portion (such as the reduced-diameter portion 25A) is formed on a cylindrical portion. In the present embodiment, for example, the step for inserting an insertion portion (such as the insertion portion 17) may be performed after the step in which a first reduced-diameter portion (such as the reduced-diameter portion 25A) is formed on a cylindrical portion. Even this configuration can achieve the same functions and effects as those of the foregoing embodiments.

Embodiment 7

Figure 18:
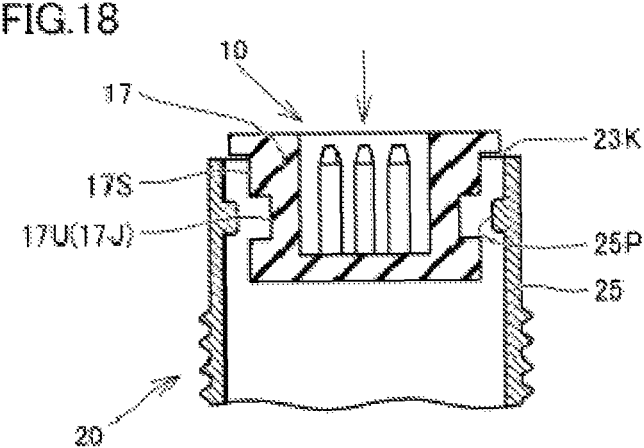
FIG. 18 is a cross-sectional view illustrating an insertion step of a crimping method according to Embodiment 7.
Figures 19, 20:
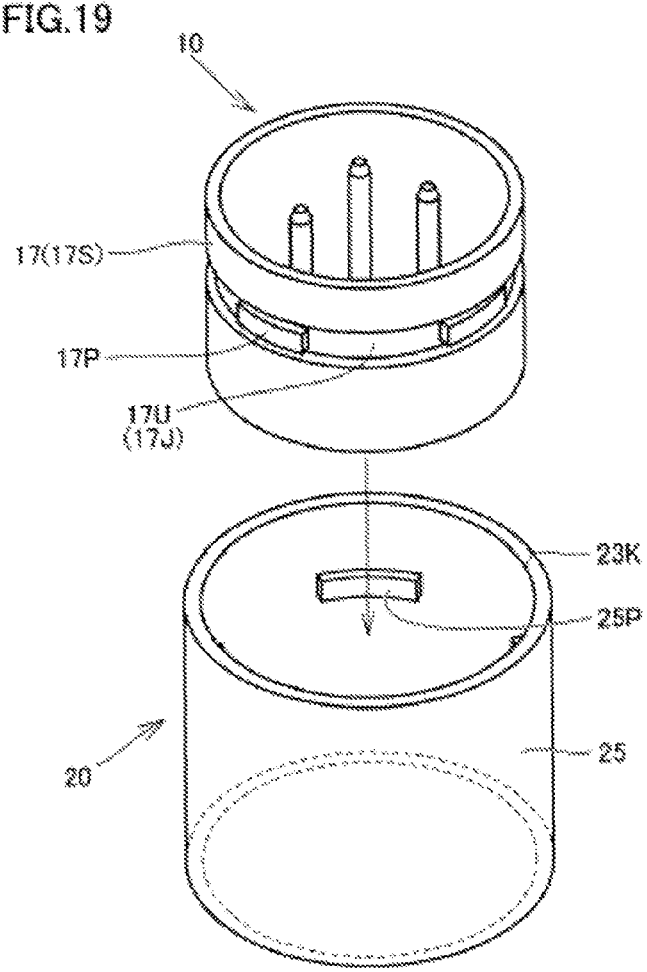
FIG. 19 is a perspective view illustrating the insertion step of the crimping method of Embodiment 7.
FIG. 20 is a diagram illustrating experimental conditions and evaluations of Examples A1 to A6.

Referring to FIGS. 18 and 19, the present embodiment uses a connector 10 that is provided with projecting portions 17P in the annular groove 17U, and a connector connecting portion 25 that is provided with projecting portions 25P on the inner circumferential surface (at the positions that correspond to the second reduced-diameter portion 22). In the annular groove 17U of the connector 10, the parts of the annular groove 17U that are not provided with the projecting portions 17P form recessed portions 17J. The positions and the shape of the recessed portions 17J correspond to the positions and the shape of the projecting portions 25P provided on the connector connecting portion 25.

When the connector connecting portion 25 of the cover body 20 is joined to the connector 10 with crimping, the projecting portions 25P enter the recessed portions 17J. The projecting portions 25P and the recessed portions 17J are fitted to each other. According to the present embodiment, not only the same functions and effects as those of the foregoing embodiments are achieved, but also the cover body 20 and the connector 10 are prevented from relatively rotating.

Other Embodiments

Foregoing Embodiments 1 to 7 employ a configuration in which an annular groove (such as the annular groove 17U or 27U) has a rectangular cross-sectional shape. The cross-sectional shape of the annular groove may be hemispherical, triangular, or trapezoidal.

In foregoing Embodiments 1 to 7, a thin sheet for improving air tightness, liquid tightness, joining capability, and the like may be arranged in the joined portion between the connector 10 and the cover body 20, and in the joined portion between the cover body 20 and the base fitting 30. The sheet may have a so-called backlash-absorbing function.

The foregoing Embodiment 7 employs a configuration in which the projecting portions (projecting portions 17P and 25P) have a rectangular cross-sectional shape. The cross-sectional shape of the projecting portions may be hemispherical, triangular, or trapezoidal. A combination of the shapes of the projecting portions and the recessed portions (recessed portions 17J) may be a combination of the same shapes, or a combination of different shapes.

The foregoing embodiments have been described taking a nearby sensor as an example of an electronic device, but the present invention is not limited to a nearby sensor. The idea disclosed in the foregoing embodiments may be applied to a photoelectric sensor, a fiber sensor, a smart sensor, a rotary encoder, a servomotor, and the like. In such a case, metal members that constitute a device such as a photoelectric sensor may be joined to each other, or a metal member and a resin member that constitute a device such as a photoelectric sensor may be joined to each other. The idea disclosed in the foregoing embodiments is also effectively applicable to a case where a metal cover and a metal case are joined to a cable.

Examples

The following will describe examples that were conducted with respect to foregoing Embodiment 1 with reference to FIGS. 20 to 24. The examples include Examples A1 to A6 (FIG. 20), Examples B1 to B5 (FIG. 21), Examples C1 to C5 (FIG. 22), Examples D1 to D5 (FIG. 23), and Examples E1 to E5 (FIG. 24). These examples have various different setting conditions (details thereof will be described later).

After the cover body 20 (connector connecting portion 25) was joined to the connector 10 (insertion portion 17), a tensile test was conducted on the joined cover body 20 and connector 10 in order to evaluate joining strength. The test results were evaluated in five levels of A to E, the joining strengths A to E being set as evaluation references. When the joining strength is at a predetermined value or more, the evaluation is given as "A" (highest), followed by evaluations "B" to "E" in descending order.

As a condition shared by the examples, the crimping machine "US-70N" made by YOSHIKAWA IRON WORKS was used. The tensile test machine "AG-10kNX" made by SHIMADZU Corporation was used. The outer diameter of the insertion portion 17 of the connector 10 (diameter of the outer circumferential surface 17S) is 26.6 mm. The material of the cover body 20 is brass, and the diameter of the inner circumferential surface of the connector connecting portion 25 is 26.9 mm.

Examples A1 to A6

Referring to FIG. 20, in Examples A1 to A6, the thickness of the connector connecting portion 25 of the cover body 20 is different between Examples A1 to A6, and the width of the annular groove 17U provided in the connector 10 is different between Examples A1 to A6, as shown in FIG. 20. On the other hand, the depth of the annular groove 17U provided in the connector 10 is uniformly 0.25 mm, and also a front end R of the spinning roller 44 (FIG. 9) for use in forming the second reduced-diameter portion 22 is uniformly 0.30 mm.

The method described with reference to Embodiment 1 above was used to join the connector connecting portion 25 of the cover body 20 to the connector 10, and then a tensile test was conducted. As a result, evaluation results as shown in FIG. 20 were obtained. Among Examples A1 to A6, excellent results were obtained in Examples A3 and A4.

Examples B1 to B5

Referring to FIG. 21, in Examples B1 to B5, the width of the annular groove 17U relative to the thickness of the cover body 20 (connector connecting portion 25) is different between Examples B1 to B5, as shown in FIG. 21. On the other hand, the thickness of the connector connecting portion 25 of the cover body 20 is uniformly 0.4 mm, the depth of the annular groove 17U is uniformly 0.25 mm, and also the front end R of the spinning roller 44 (FIG. 9) for use in forming the second reduced-diameter portion 22 is uniformly 0.30 mm.

The method described with reference to Embodiment 1 above was used to join the connector connecting portion 25 of the cover body 20 to the connector 10, and then a tensile test was conducted. As a result, evaluation results as shown in FIG. 21 were obtained. Among Examples B1 to B5, excellent results were obtained in Examples B4 and B5.

Examples C1 to C5

Referring to FIG. 22, in Examples C1 to C5, the depth of the annular groove 17U is different between Examples C1 to C5, as shown in FIG. 22. On the other hand, the thickness of the connector connecting portion 25 of the cover body 20 is uniformly 0.4 mm, the width of the annular groove 17U is uniformly 1.00 mm, and also the front end R of the spinning roller 44 (FIG. 9) for use in forming the second reduced-diameter portion 22 is uniformly 0.30 mm.

The method described with reference to Embodiment 1 above was used to join the connector connecting portion 25 of the cover body 20 to the connector 10, and then a tensile test was conducted. As a result, evaluation results as shown in FIG. 22 were obtained. Among Examples C1 to C5, excellent results were obtained in Examples C4 and C5.

Examples D1 to D5

Referring to FIG. 23, in Examples D1 to D5, the entry amount of the second reduced-diameter portion 22 is different between Examples D1 to D5, as shown in FIG. 23. On the other hand, the thickness of the connector connecting portion 25 of the cover body 20 is uniformly 0.4 mm, the width of the annular groove 17U is uniformly 1.00 mm, the depth of the annular groove 17U is uniformly 0.25 mm, and also the front end R of the spinning roller 44 (FIG. 9) for use in forming the second reduced-diameter portion 22 is uniformly 0.30 mm. Furthermore, the amount of reduction in diameter of the cover body 20 (connector connecting portion 25) is uniformly 1.5%. "Amount of reduction in diameter of the cover body 20 (connector connecting portion 25)" refers to a ratio showing how much the inner diameter is reduced at a point in time at which the second reduced-diameter portion 22 is formed from an initial state (state shown in FIG. 3) in which none of the first reduced-diameter portion 21 and the second reduced-diameter portion 22 is formed on the connector connecting portion 25.

The method described with reference to Embodiment 1 above was used to join the connector connecting portion 25 of the cover body 20 to the connector 10, and then a tensile test was conducted. As a result, evaluation results as shown in FIG. 23 were obtained. Among Examples D1 to D5, excellent results were obtained in Examples D3 and D4.

Examples E1 to E5

Referring to FIG. 24, in Examples E1 to E5, the amount of reduction in diameter of the cover body 20 (connector connecting portion 25) is different between Examples E1 to E5, as shown in FIG. 24. On the other hand, the thickness of the connector connecting portion 25 of the cover body 20 is uniformly 0.4 mm, the width of the annular groove 17U is uniformly 1.00 mm, the depth of the annular groove 17U is uniformly 0.25 mm, and also the front end R of the spinning roller 44 (FIG. 9) for use in forming the second reduced-diameter portion 22 is uniformly 0.30 mm.

The method described with reference to Embodiment 1 above was used to join the connector connecting portion 25 of the cover body 20 to the connector 10, and then a tensile test was conducted. As a result, evaluation results as shown in FIG. 24 were obtained. Among Examples E1 to E5, excellent results were obtained in Examples E3 and E4.

In Examples A1 to A6 (FIG. 20), Examples B1 to B5 (FIG. 21), Examples C1 to C5 (FIG. 22), Examples D1 to D5 (FIG. 23), and Examples E1 to E5 (FIG. 24), no result was obtained that shows Evaluation E (the lowest evaluation among A to E) in which the joining strength is a predetermined value or less. Accordingly, it is clear that, by employing the above-described configuration of Embodiment 1, it is possible to crimp an outer member against an inner member while suppressing local deformation that occurs, and it is possible to realize a highly reliable joined structure in which breakage of the members rarely occurs, even if a metal material with low ductility is used or a relatively thin metal material is used.

The embodiments and the examples of the present invention have been described so far, but the content of that disclosed above is exemplary in all respects and not restrictive. The technical scope of the present invention is defined by the claims, and is intended to encompass all modifications in the sense and the scope equivalent to the claims.

INDEX TO THE REFERENCE NUMERALS

10 . . . Connector, 16 . . . Flange, 17, 27 . . . Insertion portion, 17J . . . Recessed portion, 17P, 25P . . . Projecting portion, 17S, 27S . . . Outer circumferential surface, 17U, 17U1, 17U2, 27U . . . Annular groove, 18 . . . Terminal pin, 20 . . . Cover body, 21, 21F, 31 . . . First reduced-diameter portion, 21C, 21F, 21G, 31C, 31F . . . First plastically-deformed portion, 22, 22X, 22Y, 32 . . . Second reduced-diameter portion, 22C, 22D, 22E, 22F, 32C, 32D . . . Second plastically-deformed portion, 23, 33 . . . Cylindrical portion, 23K, 33K . . . Opening, 24, 34 . . . Main body portion, 25 . . . Connector connecting portion, 25A, 35A . . . Reduced-diameter portion, 25B, 35B . . . Non-deformed portion, 25C . . . Plastically-deformed portion, 26 . . . Disk portion, 30 . . . Base fitting, 35 . . . Accommodation portion, 38 . . . Front face, 41, 42, 43, 44, 45, 46 . . . Spinning roller, 41S, 42S, 43S, 44S . . . Surface, 45G . . . Small-diameter portion, 45H . . . Large-diameter portion, 100 . . . Electronic device, L1, L2 . . . Distance, ST1 . . . Preparation step, ST2, ST5, ST7 . . . Insertion step, ST3, ST4, ST6, ST7 . . . Diameter-reducing step

The invention claimed is:

1. A crimp structure in an electronic device, in which an inner member and an outer member that is arranged outside the inner member are joined to each other,
wherein the inner member comprises:
a connector comprising an insertion portion housing terminal pins to provide an electrical connection to the electronic device, the insertion portion having an outer circumferential surface having a shape of a columnar surface; and
an annular groove that is provided in the outer circumferential surface, wherein the outer member comprises:
a main body portion; and
a cylindrical portion that is continuous with the main body portion, and forms an opening into which the insertion portion is inserted,
the cylindrical portion comprises:
a first reduced-diameter portion that is continuous with the main body portion via a first plastically-deformed portion, and is formed so as to be located further inward in a radial direction than the main body portion due to plastic deformation of the first plastically-deformed portion; and
a second reduced-diameter portion that is continuous with the first reduced-diameter portion via a second plastically-deformed portion, and is formed so as to be located further inward in the radial direction than the first reduced-diameter portion, due to plastic deformation of the second plastically-deformed portion, and
wherein at least a part of the second reduced-diameter portion has entered the annular groove.

2. The crimp structure according to claim 1, wherein the outer circumferential surface of the insertion portion is made of a resin member.

3. The crimp structure according to claim 1, wherein a plurality of the annular grooves are provided in the outer circumferential surface of the insertion portion.

4. The crimp structure according to claim 1, wherein the annular groove has a recessed portion, the second reduced-diameter portion has a projecting portion, and the projecting portion and the recessed portion are fitted to each other.

5. An electronic device comprising:
the crimp structure according to claim 1.

6. A crimping method of performing crimping of a crimp structure in an electronic device, to join an outer member to an inner member that is arranged inside the outer member, the method comprising:
preparing the inner member that comprises a connector comprising an insertion portion housing terminal pins to provide an electrical connection to the electronic device, the insertion portion having an outer circumferential surface having a shape of a columnar surface, and an annular groove provided in the outer circumferential surface;
preparing the outer member that includes a main body portion, and a cylindrical portion that is continuous with the main body portion, and forms an opening into which the insertion portion is to be inserted;

inserting the insertion portion into the cylindrical portion; and reducing a diameter of the cylindrical portion with spinning, wherein, by reducing the diameter of the cylindrical portion, a first reduced-diameter portion that is formed so as to be located further inward in a radial direction than the main body portion, and a second reduced-diameter portion that is formed so as to be located further inward in the radial direction than the first reduced-diameter portion are formed on the cylindrical portion, and at least a part of the second reduced-diameter portion has entered the annular groove.

7. The crimping method according to claim 6,
wherein inserting the insertion portion is performed prior to forming the first reduced-diameter portion on the cylindrical portion.

8. The crimping method according to claim 6,
wherein inserting the insertion portion is performed after forming the first reduced-diameter portion on the cylindrical portion.

9. The crimping method according to claim 6,
wherein, reducing the diameter of the cylindrical portion comprises forming the first reduced-diameter portion on the cylindrical portion, and then forming the second reduced-diameter portion on the cylindrical portion.

10. The crimping method according to claim 6,
wherein, reducing the diameter of the cylindrical portion comprises forming the second reduced-diameter portion on the cylindrical portion, and then forming the first reduced-diameter portion on the cylindrical portion.

11. The crimping method according to claim 6,
wherein the first reduced-diameter portion and the second reduced-diameter portion are formed by using one spinning roller.

* * * * *